United States Patent [19]

Sharp

[11] Patent Number: 5,499,850
[45] Date of Patent: Mar. 19, 1996

[54] KENNEL DOOR LATCH

[75] Inventor: Douglas J. Sharp, Arlington, Tex.

[73] Assignee: Doskocil Mfg. Co., Inc., Arlington, Tex.

[21] Appl. No.: 251,908

[22] Filed: Jun. 1, 1994

[51] Int. Cl.⁶ .................. E05C 1/12; E05C 9/04
[52] U.S. Cl. .................. 292/42; 292/347
[58] Field of Search .................. 292/42, 37, 140, 292/145, 347, 357, 33; 74/553

[56] References Cited

U.S. PATENT DOCUMENTS

| | | |
|---|---|---|
| 203,360 | 5/1878 | Moffett . |
| 622,546 | 4/1899 | Shaw . |
| 709,591 | 9/1902 | Bennett . |
| 979,884 | 12/1910 | Pelar . |
| 1,201,722 | 10/1916 | Halteman . |
| 1,243,115 | 10/1917 | Shur . |
| 1,712,792 | 5/1929 | Hansen . |
| 2,301,078 | 11/1942 | Perron ............................ 292/202 |
| 2,542,332 | 2/1951 | Holmsten ........................ 292/205 |
| 2,704,466 | 3/1955 | Way ................................. 74/553 |
| 2,750,218 | 6/1956 | Clifton, Jr. ...................... 292/140 |
| 4,389,062 | 6/1983 | Rosenberg ....................... 292/190 |
| 4,575,141 | 3/1986 | Burns ......................... 292/347 X |
| 4,621,845 | 11/1986 | Vanago ............................. 292/37 |
| 4,807,914 | 2/1989 | Fleming et al. .................. 292/48 |
| 4,964,755 | 10/1990 | Lewis et al. ..................... 404/25 |
| 5,042,855 | 8/1991 | Bennett et al. ................. 292/241 |
| 5,071,176 | 12/1991 | Smith .......................... 292/42 X |

FOREIGN PATENT DOCUMENTS

| | | | |
|---|---|---|---|
| 631479 | 1/1938 | Germany | ............... 292/37 |
| 2324619 | 12/1974 | Germany | ............... 292/357 |
| 2752213 | 5/1979 | Germany | ............... 292/347 |

Primary Examiner—Rodney M. Lindsey
Attorney, Agent, or Firm—Mark D. Perdue; Andrew J. Dillon

[57] ABSTRACT

A latch system is provided having utility in securing a planar member in a closed position within a housing having a portal. A base plate is secured to the planar member and a rotatable member having a generally circular periphery is coupled to the base plate. A cover is secured to the base plate and rotatably retains the rotatable member thereon. The cover includes a generally circular aperture having a diameter less than that of the periphery of the rotatable member, wherein upon assembly the generally circular periphery of the rotatable member opposes the generally circular aperture of the cover. At least one detent protrusion is formed on either the generally circular periphery of the rotatable member or the diameter of the generally circular aperture in the cover. At least one detent recess is formed in the other of the generally circular periphery of the rotatable member or the diameter of the generally circular aperture and opposes the detent protrusion. The detent recess is formed such that, upon engagement with the detent protrusion, purely rotational movement of the rotatable member causes axial movement of the rotatable member relative to the cover and disengagement of the detent protrusion with the detent recess. A pair of elongate members are coupled to the rotatable member such that rotation of the rotatable member causes the elongate members to reciprocate in and out of engagement with the apertures in the periphery of the portal.

11 Claims, 3 Drawing Sheets

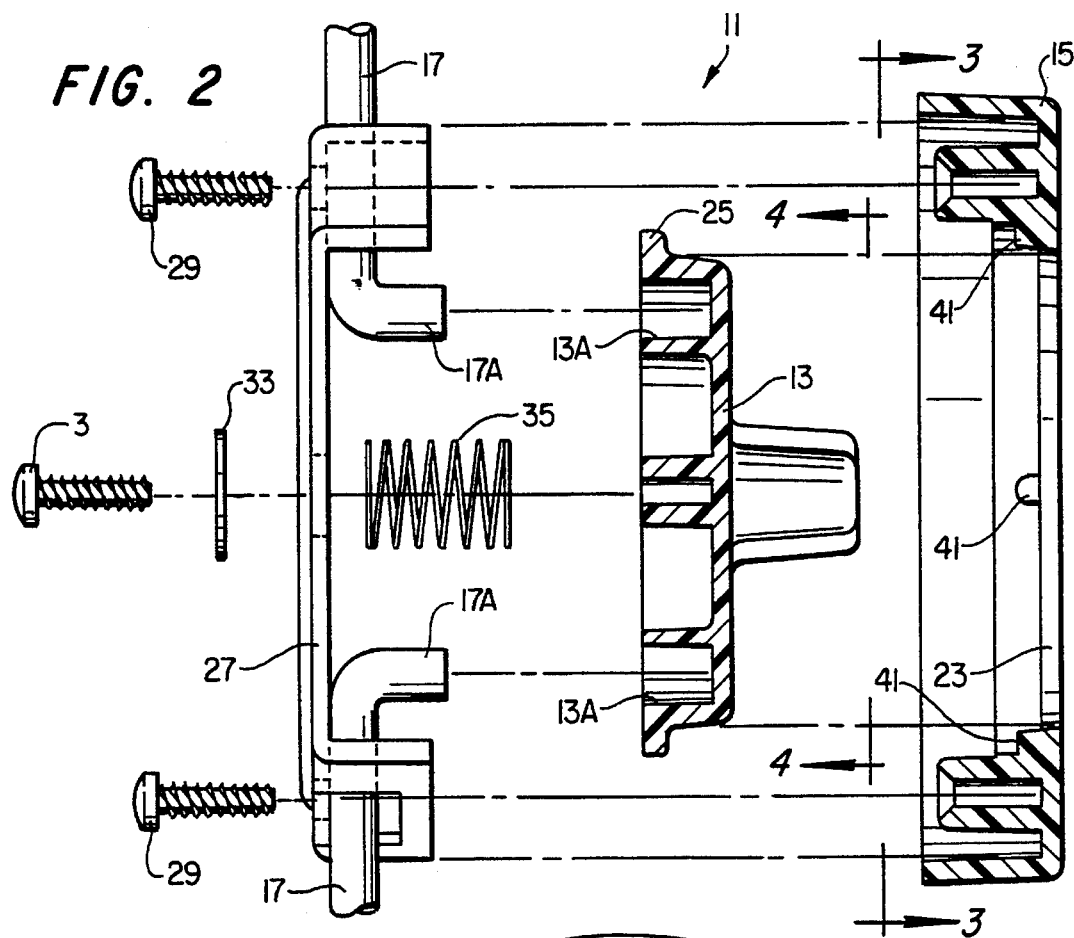
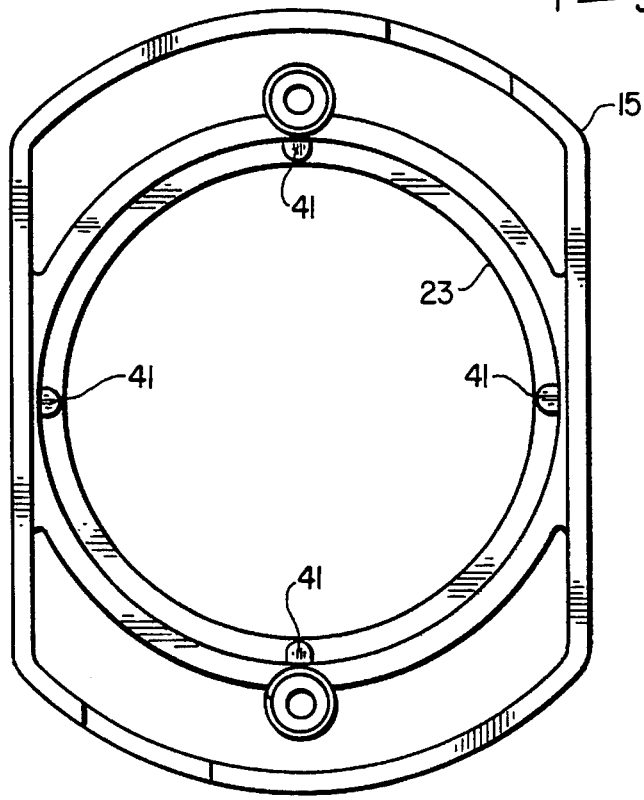

KENNEL DOOR LATCH

BACKGROUND OF THE INVENTION

1. Field of the Invention

This invention relates in general to an improved latch system for securing a door in a closed position and in particular to a latch system to temporarily secure a rotatable member against rotation. Still more particularly, the present invention provides an improved latch system that secures a door in a closed position by temporarily securing a rotatable member against rotation, which temporarily prevents reciprocation of one or more elongate members connected to the rotatable member.

2. Background Information

A long-standing practice exists for housing animals in kennels. In particular, portable kennels have been used to transport animals over various distances. For example, portable kennels are used to secure animals for transportation from one location to another on commercial carriers, such as airplanes, ships, and buses. Furthermore, these kennels are used to transport animals over shorter distances, such as from a home to a veterinary clinic. These portable kennels may also be used for securing an animal indoors for a short period of time.

Portable kennels generally comprise a housing unit, a door, and a means for securing the door in a closed position, such as a latch or a lock. The prior art discloses various systems for securing the door or a cover in a closed position. For example, commonly owned U.S. Pat. No. 5,071,176 discloses a latch system in which a rotatable member is provided on the door of a kennel. Multiple elongate members are secured to the rotatable member and reciprocate in and out of engagement with apertures on the kennel, responsive to rotation of the rotatable member, to selectively secure the door in an opening of the kennel. A latch member is coupled between the door and at least one of the elongate members to secure the elongate members against angular and reciprocal movement, thereby maintaining the elongate members in engagement with apertures in the kennel, and maintaining the door in a closed position. To open the door, the latch member must be depressed while the rotatable member is rotated.

U.S. Pat. No. 4,964,755 discloses a locking manhole cover in which multiple elongate members or bolts carried by the manhole cover engage an annular flange to secure the manhole cover against removal. Rotation of a crank plate with a key retracts the bolts from engagement with the flange. In operation, the key must be inserted into the manhole cover and pushed or axially moved during rotation of the key.

U.S. Pat. No. 1,712,792 discloses a door fastener including movable rods engaging the top and bottom of a door frame. The movable rods are extended into and retracted from engagement with the door frame by rotation of a bolt plate coupled to T-handle. A spring finger including a lug engages notches on a flange to provide a detent means at the extreme positions of the bolt plate.

The foregoing patents either disclose complex latch mechanisms or latch systems that require awkward manipulation, such as pushing and turning or manipulating two separate latch members, to actuate the latch.

A need exists, therefore, for a latch system that is of simple construction and can be temporarily restrained in an open or closed position without awkward manipulation of the latch.

SUMMARY OF THE INVENTION

It is, therefore, one object of the present invention to provide an improved latch system for securing a door in a closed position.

It is another object of the present invention to provide a latch system to temporarily secure a rotatable member and multiple elongate members pivotally connected to the rotatable member in an engaged position, securing the door in a closed position.

It is yet another object of the present invention to provide an improved latch system that temporarily secures the door in a closed position.

The foregoing and other objects are achieved as is now described. In accordance with the present invention, a latch system is provided having utility in securing a planar member in a closed position within a housing having a portal. The portal includes a defined periphery with a plurality of apertures therein. A planar member is pivotally mounted in the portal. A base plate is secured to the planar member and a rotatable member having a generally circular periphery is coupled to the base plate. A cover is secured to the base plate and rotatably retains the rotatable member thereon. The cover includes a generally circular aperture having a diameter less than that of the periphery of the rotatable member, wherein upon assembly the generally circular periphery of the rotatable member opposes the generally circular aperture of the cover. At least one detent protrusion is formed on either the generally circular periphery of the rotatable member or the diameter of the generally circular aperture in the cover. At least one detent recess is formed in the other of the generally circular periphery of the rotatable member or the diameter of the generally circular aperture and opposes the detent protrusion. Upon engagement of the detent protrusion with the detent recess, the rotatable member is temporarily restrained against rotation. The detent recess is formed such that, upon engagement with the detent protrusion, purely rotational movement of the rotatable member causes axial movement of the rotatable member relative to the cover and disengagement of the detent protrusion with the detent recess. A pair of elongate members are coupled to the rotatable member such that rotation of the rotatable member causes the elongate members to reciprocate in and out of engagement with the apertures in the periphery of the portal. Engagement of the elongate members with the apertures restrains the planar member against movement in the portal.

According to a preferred embodiment of the present invention, the housing is a kennel for housing an animal and the planar member is a door on the kennel.

According to a preferred embodiment of the present invention, four detent recesses are formed in the generally circular periphery of the rotatable member, and four detent protrusions are formed on the cover adjacent the diameter of the aperture in the cover. The detent recesses preferably are beveled to facilitate disengagement of the detent protrusions from the detent recesses responsive to purely rotational movement of the rotatable member.

DESCRIPTION OF THE DRAWINGS

The novel features believed characteristic of the invention are set forth in the appended claims. The invention itself, however, as well as a preferred mode of use, and further objects and advantages thereof, will best be understood with reference to the following detailed description of an illus

FIG. 2 is an exploded elevation view, partially in section, of the latch system according to the present invention;

FIG. 3 is an elevation view of a portion of the latch system illustrated in FIG. 2;

DESCRIPTION OF THE PREFERRED EMBODIMENT

Figure 1:
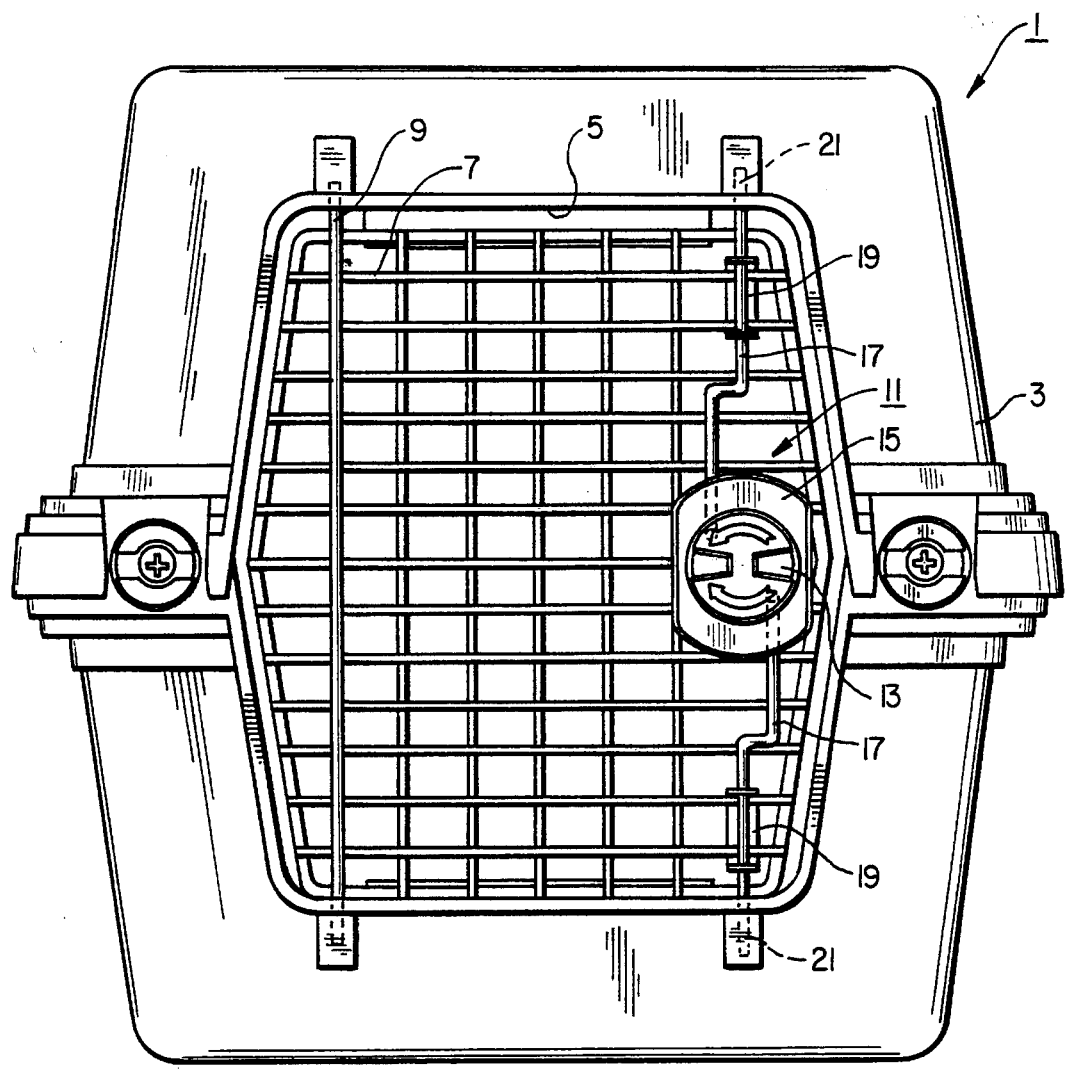
- FIG. 1 depicts a front elevation view of the latch system according to the present invention mounted on a kennel door.

With reference now to the Figures and in particular with reference to FIG. 1, there is depicted a front elevation view of a kennel 1 as contemplated by present invention. Kennel 1 comprises a housing 3, which includes a portal or opening 5. A planar member or door 7, preferably in the form of a wire grid, is pivotally mounted in portal 5 by means of an elongate hinge rod 9, which is secured to door 7. A latch system 11 according to the present invention is secured to door 7 and includes a rotatable member or knob 13, which is partially retained on door 7 by a cover 15. A pair of elongate rods 17 are coupled to rotatable member 13 and to door 7 by means of guide members 19. Rotation of knob 13 in one of two directions (as indicated by arrows in FIG. 1) selectively reciprocates rods 17 into and out of engagement with apertures 21 in the periphery of portal 5. With rods 17 engaged with apertures 21, door 7 is effectively secured against opening within portal 5 of kennel 1.

Figure 4:
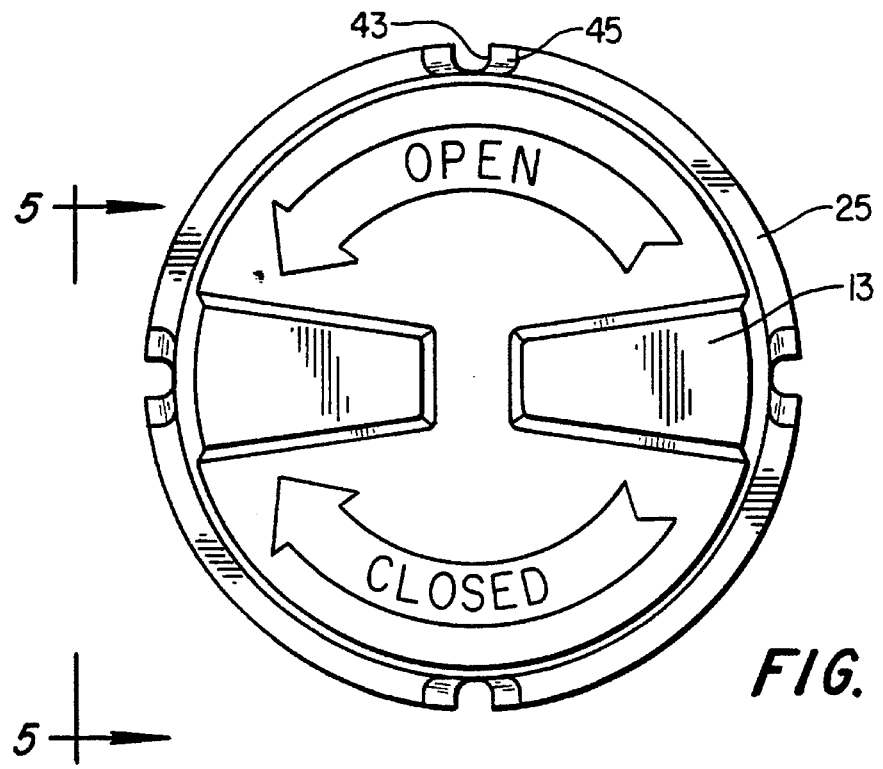
FIG. 4 is an elevation view of another portion of the latch system illustrated in FIG. 2.
Figure 5:
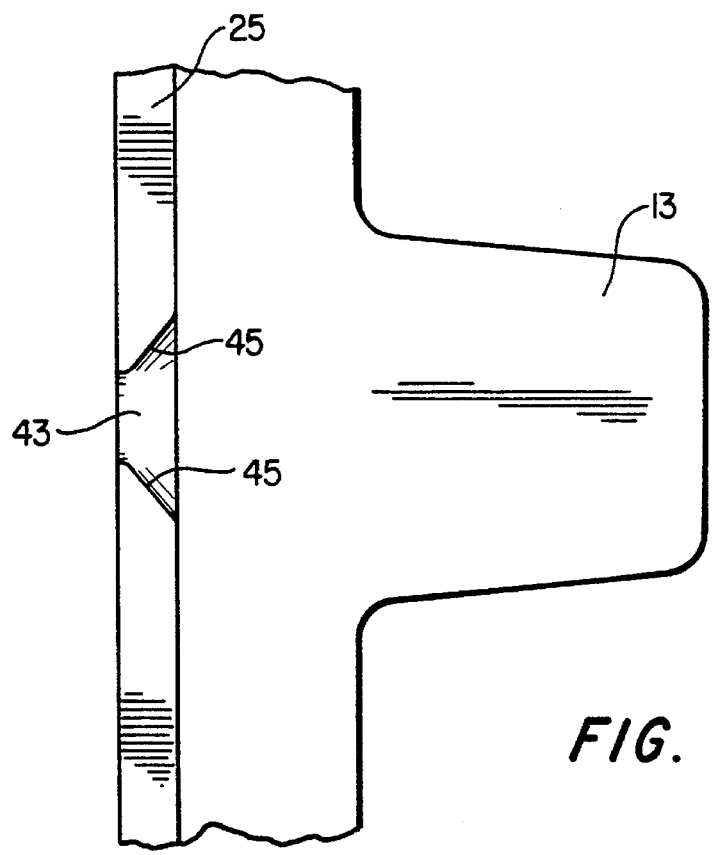
FIG. 5 is a side elevation view of the portion of the latch system illustrated in FIG. 4.

Referring now to FIG. 2, there is illustrated an exploded view, partially in section, of latch system 11 according to the present invention. FIGS. 3, 4, and 5 illustrate elevation views of portions of latch system 11 illustrated in FIG. 2. Latch system includes knob 13, which is provided with a pair of eccentric apertures 13A, which receive upturned ends 17A of rods 17.

A cover 15 is secured to base plate 27 to partially cover rods 17. Cover 15 includes a generally circular aperture 23, which has a diameter smaller than that of a circular periphery 25 of knob 13. Upon assembly, periphery 25 of knob 13 opposes the diameter of aperture 23 in cover 15, wherein knob 13 is rotatably secured to a base plate 27, which is in turn secured to door 7 by screws 29 or similar fastening means. A centrally located screw 31 or other fastening means cooperates with washer 33 and coil spring 35 to rotatably secure knob 13 to base plate 27. Coil spring 35 serves as a biasing member to urge knob 13 outwardly, wherein generally circular periphery 25 of knob 13 opposes and abuts the diameter of aperture 23 in cover 15. As illustrated in FIGS. 2 and 3, cover 15 is provided with four detent protrusions 41, adjacent to and spaced about the circumference of aperture 23 at 90 degree intervals.

With reference to FIG. 4 and 5, knob 13 is illustrated in greater detail. Knob 13 includes four detent recesses 43 formed in generally circular periphery 25 at 90 degree intervals. As illustrated in FIG. 5, detent recesses 43 are beveled 45 such that upon engagement of detent protrusions 41 of cover 15 with detent recesses 43 of knob 13, knob 13 is temporarily restrained from rotational movement relative to cover 15. However, when it is desired to obtain rotational movement of knob 13, application of purely rotational force to knob 13 causes detent protrusions 41 to ride up on beveled surfaces 45 of detent recesses 43 in knob 13, urging knob 13 axially inwardly to disengage detent protrusions 41 from detent recesses 43. Thus, no awkward, combination axial and rotational force need be imparted to knob 13. As described with reference to FIG. 1, rotation of knob 13 causes rods 17 to reciprocate in and out of engagement with apertures 21 in portal 5, thereby selectively maintaining door 7 in a closed position.

With reference to FIGS. 1–5, the operation of the present invention will be described. Upon assembly of latch system 11, coil spring 35 urges outer periphery 25 of knob 13 into engagement with aperture 23 in cover. At the limits of rotational travel of knob 13, detent protrusions 41 in aperture 23 engage detent recesses 43 in periphery 25 of knob 13, thus temporarily restraining knob 13 against inadvertent rotational movement in both the locked and unlocked positions. When it becomes desirable to open or close door 7, knob 13 is rotated to reciprocate rods 17 into and out of engagement with apertures 21 in portal 5 of kennel 1. A user may impart a purely rotational force to knob 13 and, due to bevels 45 in detent recesses 43, detent protrusions 41 will ride up on bevels 45, causing knob 13 to move axially inwardly and disengage detent protrusions 41 from detent recesses 43, allowing unrestrained movement of knob 13 between open (unlocked) and closed (locked) positions.

The latch system according to the present invention possesses significant advantages. Specifically, the latch system is of simple construction and provides a latch including a detent means that is easily manipulated without awkward push and turn motion and the like.

The invention has been described with reference to a specific embodiment thereof. The invention is thus not limited but is susceptible to variation and modification without departing from the scope of the invention.

I claim:

1. A latch system having utility in securing a planar member in a closed position comprising:

a kennel housing having a portal, said portal having a defined periphery with a plurality of apertures within said periphery, said planar member being pivotally mounted in said portal;

a base plate secured to said planar member;

a knob rotatably coupled to said base plate, said knob having a generally circular periphery;

a cover secured to said base plate and including a generally circular aperture having a diameter less than that of said periphery of said knob, wherein upon assembly said generally circular periphery of said knob opposes said generally circular aperture of said cover to rotatably retain said knob on said base plate;

at least one detent protrusion formed on one of said generally circular periphery of said knob and said cover adjacent said diameter of said generally circular aperture;

at least one detent recess formed in the other of said generally circular periphery of said knob and said cover adjacent said diameter of said generally circular aperture and opposing said at least one detent protrusion, said at least one detent protrusion for engagement with said at least one detent recess to temporarily restrain said knob against rotation, said at least one detent recess being beveled such that upon engagement with said at least one detent protrusion purely rotational movement of said knob causes axial movement of said knob relative to said base plate and disengagement of said at least one detent protrusion with said at least one detent recess;

a plurality of elongate members carried on said planar member for reciprocation into and out of engagement with said apertures within said periphery of said portal, said engagement of said elongate members with said apertures within said periphery of said portal restraining said planar member against movement in said portal; and means coupling said elongate members to said knob for reciprocating said elongate members into and out of engagement with said apertures within said periphery of said portal responsive to rotation of said knob.

2. The latch system of claim 1 wherein said housing is a kennel for housing of an animal and said planar member is a door thereto.

3. The latch system of claim 1 wherein said planar member is a wire grid.

4. The latch system of claim 1 wherein four detent recesses are formed in said generally circular periphery of said knob and four detent protrusions are formed on said diameter of said aperture in said cover.

5. A latch system having utility in securing a planar member in a closed position comprising:

a housing having a portal, said portal having a defined periphery with a plurality of apertures within said periphery, said planar member being pivotally mounted in said portal;

a base plate secured to said planar member;

a knob coupled to said base plate, said knob having a generally circular periphery;

a cover secured to said base plate and including a generally circular aperture having a diameter less than that of said periphery of said knob, wherein upon assembly said generally circular periphery of said knob opposes said generally circular aperture of said cover to rotatably retain said knob on said base plate;

at least one detent protrusion formed on one of said generally circular periphery of said knob and said cover adjacent said diameter of said generally circular aperture;

at least one detent recess formed in the other of said generally circular periphery of said knob and said cover adjacent said diameter of said generally circular aperture and opposing said at least one detent protrusion, said at least one detent protrusion for engagement with said at least one detent recess to temporarily restrain said knob against rotation, said at least one detent recess being beveled such that upon engagement with said at least one detent protrusion purely rotational movement of said knob causes axial movement of said knob relative to said base plate and disengagement of said at least one detent protrusion with said at least one detent recess;

a plurality of elongate members carried on said planar member for reciprocation into and out of engagement with said apertures within said periphery of said portal, said engagement of said elongate members with said apertures within said periphery of said portal restraining said planar member against movement in said portal; and means coupling said elongate members to said knob for reciprocating said elongate members into and out of engagement with said apertures within said periphery of said portal responsive to rotation of said knob.

6. The latch system of claim 5 wherein said housing is a kennel for housing of an animal and said planar member is a door thereto.

7. The latch system of claim 5 wherein said planar member is a wire grid.

8. The latch system of claim 5 wherein four detent recesses are formed in said generally circular periphery of said knob and four detent protrusions are formed on said cover adjacent said diameter of said aperture in said cover.

9. A latch system having utility in securing a door of a kennel in a closed position comprising:

a housing having a portal, said portal having a defined periphery with a plurality of apertures within said periphery, said door being pivotally mounted in said portal;

a base plate secured to said door;

a knob coupled to said base plate, said knob having a generally circular periphery;

a cover secured to said base plate and including a generally circular aperture having a diameter less than that of said periphery of said knob, wherein upon assembly said generally circular periphery of said knob opposes said generally circular aperture of said cover to rotatably retain said knob on said base plate;

at least one detent protrusion formed on said cover adjacent said diameter of said generally circular aperture;

at least one detent recess formed on said generally circular periphery of said knob and said cover adjacent said diameter of said generally circular aperture and opposing said at least one detent protrusion, said at least one detent protrusion for engagement with said at least one detent recess to temporarily restrain said knob against rotation, said at least one detent recess being beveled such that upon engagement with said at least one detent protrusion purely rotational movement of said knob causes axial movement of said knob relative to said base plate and disengagement of said at least one detent protrusion with said at least one detent recess;

a pair of rods carried by guide members on said door, said rods for reciprocation into and out of engagement with said apertures within said periphery of said portal, said engagement of said elongate members with said apertures within said periphery of said portal restraining said door against movement in said portal; and means coupling said rods to said knob for reciprocating said elongate members into and out of engagement with said apertures within said periphery of said portal responsive to rotation of said knob.

10. The latch system of claim 9 wherein said door is a wire grid.

11. The latch system of claim 9 wherein four detent recesses are formed in said generally circular periphery of said knob and four detent protrusions are formed on said cover adjacent said diameter of said aperture in said cover.

* * * * *